United States Patent [19]
Wada et al.

[11] Patent Number: 6,024,136
[45] Date of Patent: Feb. 15, 2000

[54] BINDING DEVICE, BINDING BAND, AND PROCESS FOR MANUFACTURING BINDING BAND

[75] Inventors: Tetsurou Wada, Yokohama; Shoichi Fukami, Tokyo, both of Japan

[73] Assignee: J. E. Kabushiki-Kaisya, Tokyo, Japan

[21] Appl. No.: 09/052,708

[22] Filed: Mar. 31, 1998

[30] Foreign Application Priority Data

Apr. 9, 1997 [JP] Japan .................................... 9-106719

[51] Int. Cl.[7] ...................................................... B21F 9/02
[52] U.S. Cl. ...................................... 140/123.6; 140/93 A
[58] Field of Search .................................. 140/93 A, 93.2, 140/123.6

[56] References Cited

U.S. PATENT DOCUMENTS 5,595,220   1/1997   Leban et al. ............................ 140/93.2

*Primary Examiner*—Lowell A. Larson
*Attorney, Agent, or Firm*—Frishauf, Holtz, Goodman, Langer & Chick, P.C.

[57] ABSTRACT

A binding device includes a set part into which an assembly of binding bands is inserted after being bent in a generally U-shaped configuration, a first cutter for cutting a single binding band off the assembly of binding bands through operation of a lever, a pusher device for pushing the single binding band thus cut off forwardly, a curved pivot guide arm for guiding a distal end of the single binding band towards a retainer portion formed on an opposite end of the single binding band, a push-in device for pushing the distal end of the single binding band into the retainer portion, a reducing device for reducing a distal end portion of the single binding band which protrudes from the retainer portion, a second cutter for cutting off the reduced distal end portion of the single binding band which still protrudes from the retainer portion, and a feed device for feeding the assembly of binding bands in a manner so as to match the pitch of the plurality of binding bands. The set part, the first cutter, the pusher device, the curved pivot guide arm, the push-in device, the reducing device, the second cutter, and the feed device are formed on a base plate having window openings through which working portions thereof protrude. A lower end of a link arm is pivotally connected to the lever, and an upper end of the link arm is fixed to a cross piece that is integrally coupled to the base plate in order to mechanically drive operation of the binding device responsive to a single mechanical movement of the lever.

7 Claims, 15 Drawing Sheets

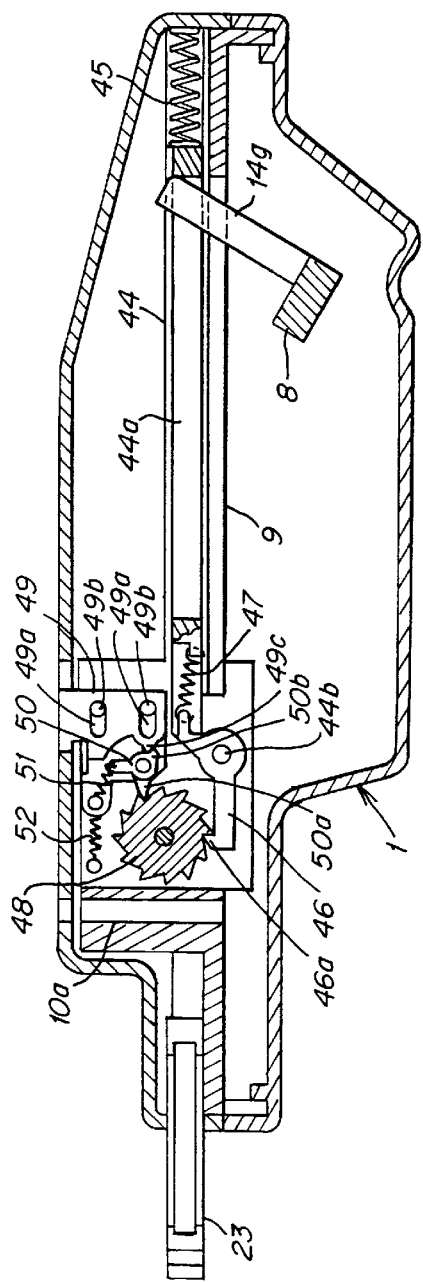
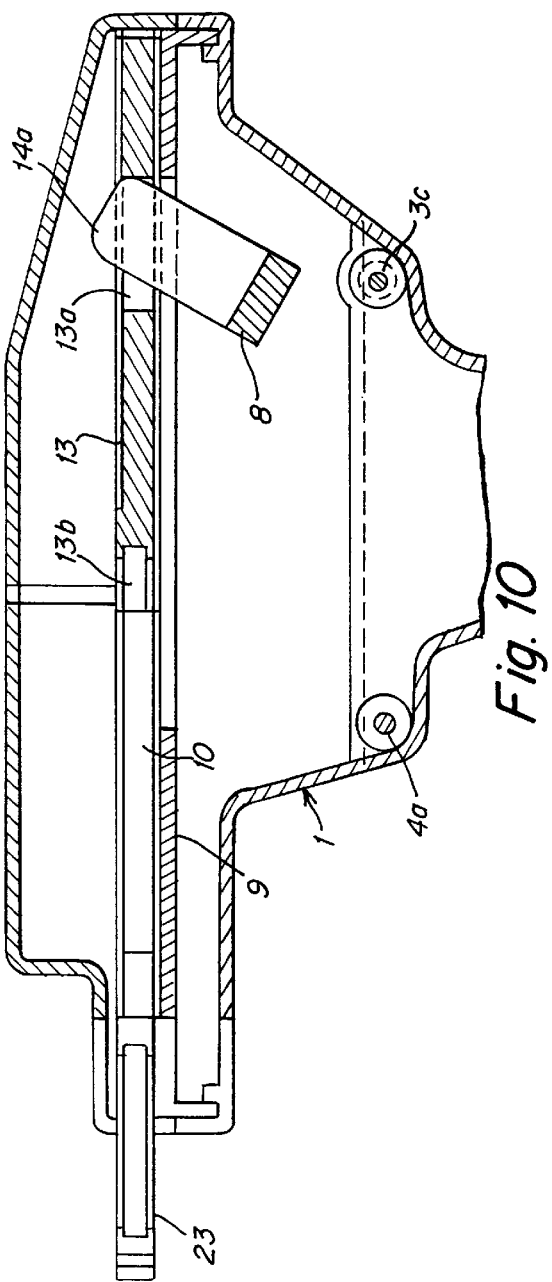
Fig. 9
Fig. 10

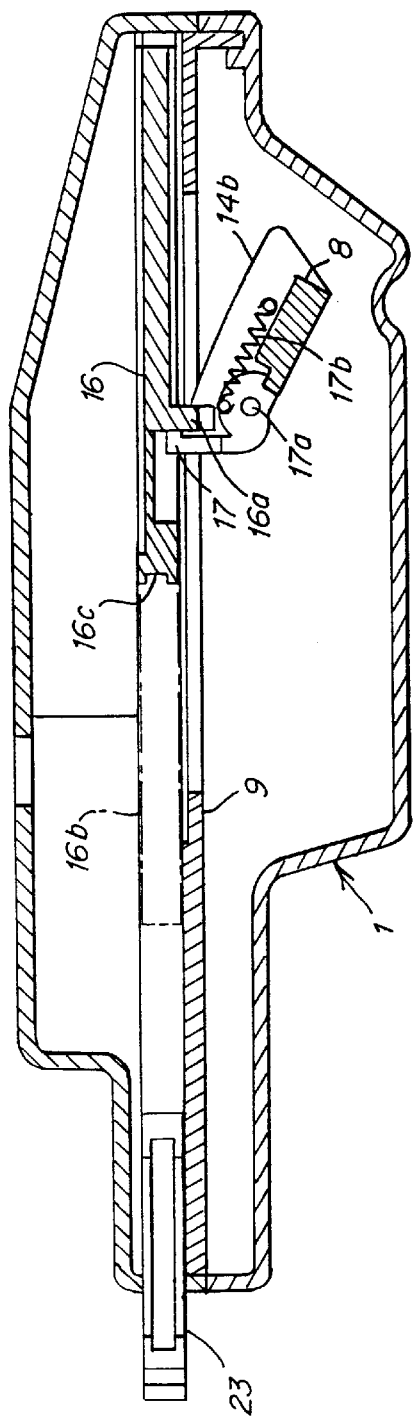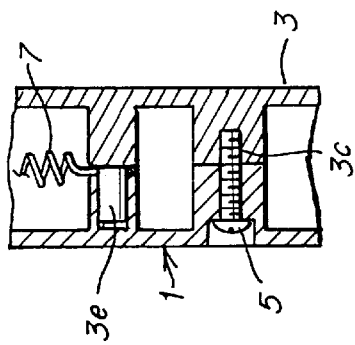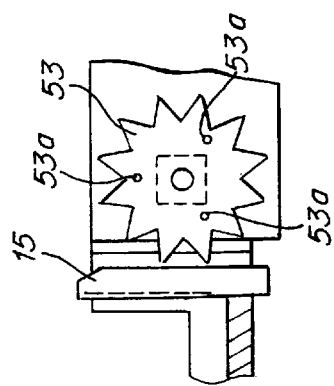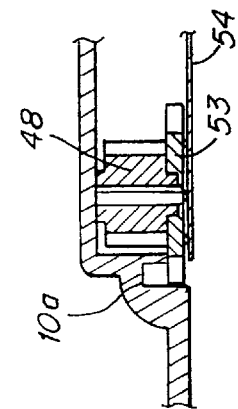

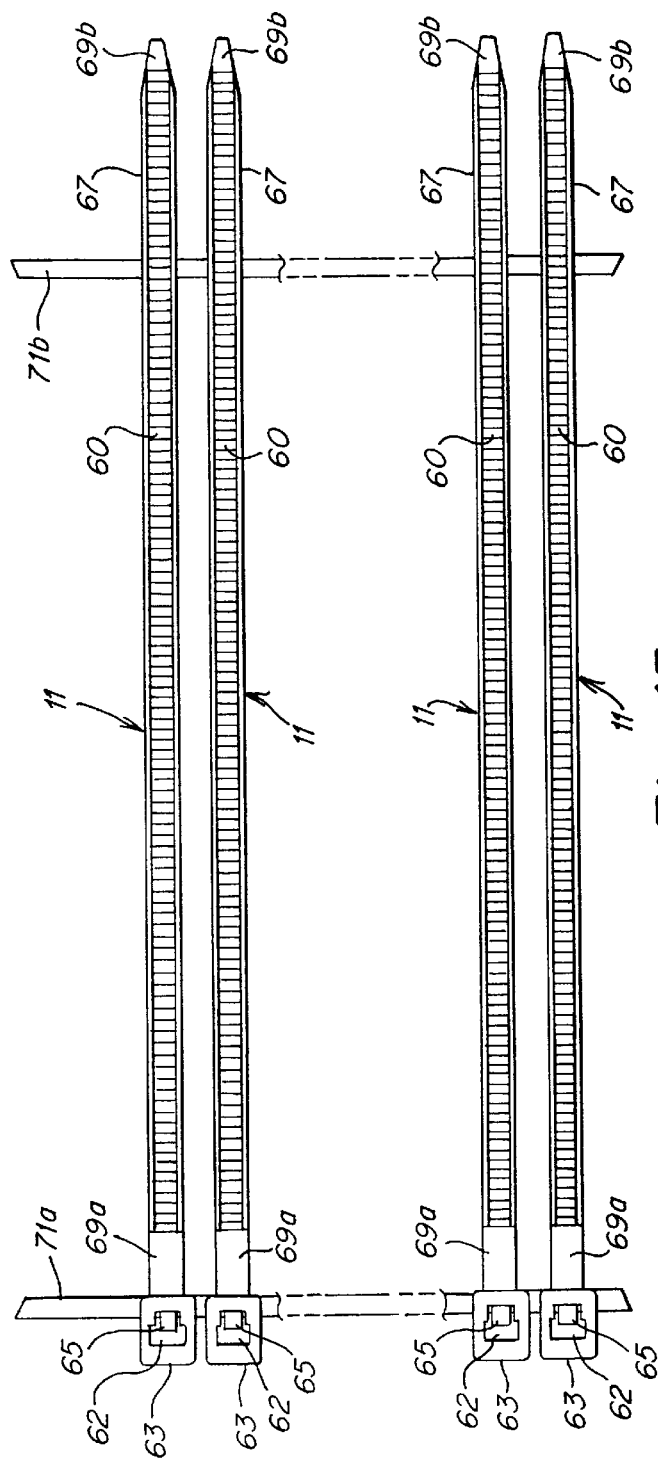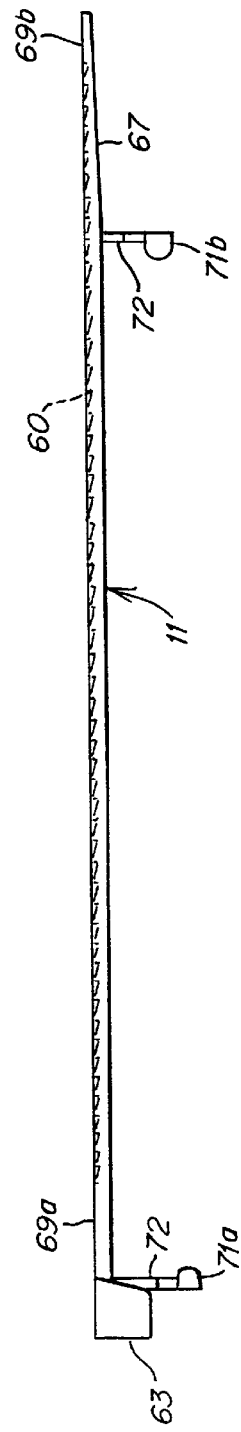

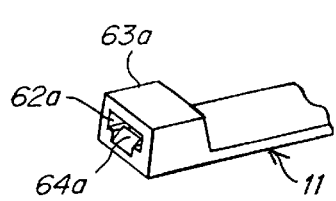
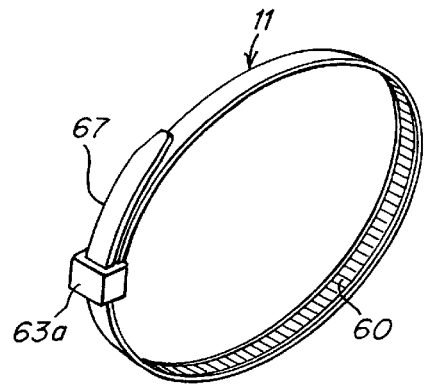
Fig. 22　　　　Fig. 23
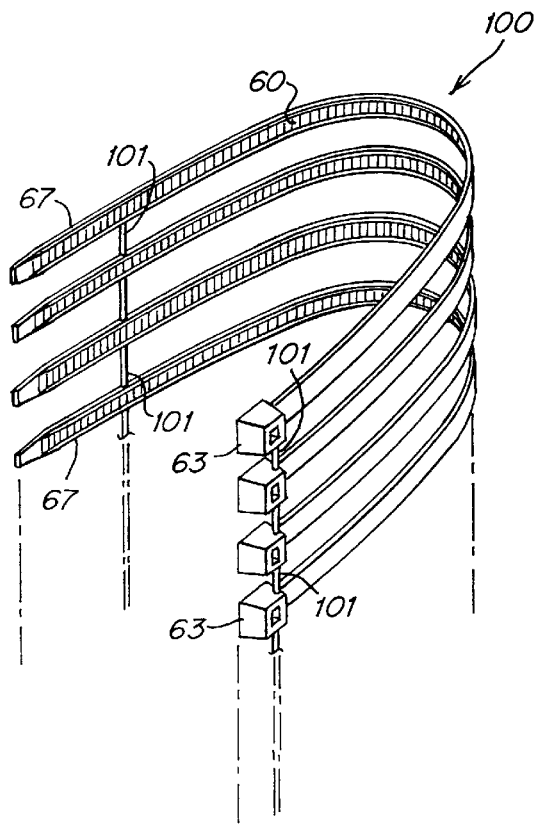
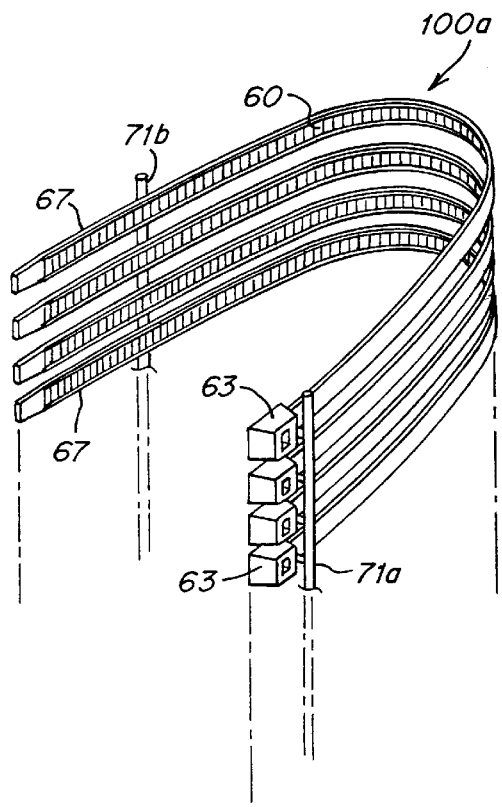
Fig. 24　　　　Fig. 25

BINDING DEVICE, BINDING BAND, AND PROCESS FOR MANUFACTURING BINDING BAND

BACKGROUND OF THE INVENTION

This invention relates to a binding device, a binding band used in the binding device, and a process for manufacturing the binding band.

Use of binding bands molded from plastic material having a comparatively strong stiffness has heretofore been known because of toughness in binding. The binding bands on at least one surface thereof a plurality of engagement claws arranged an array, and is integrally provided on one end thereof with a retainer portion including therein an engagement portion having an insertion hole for inserting a leading end of the binding band and adapted to engage with the claws. This binding band is wound around an object to be bound and then the distal end of the binding band is inserted into the insertion hole and tightened. A projecting end of the binding band is then cut off as required.

However, since the above-mentioned operation is all manually performed, efficiency is degraded and irregularity of tightening force occurs depending on which part of an object is to be bound and also depending on who does this work. In some cases, the tightening force is overly increased and in other cases, the tightening force is overly decreased. For the operators, moreover, their fingers may become very tired.

The present invention has been accomplished in view of the above shortcomings inherent in the prior art device.

SUMMARY OF THE INVENTION

It is, therefore, an object of the present invention to provide a binding device, a binding band used in the binding device, and a process for manufacturing the binding band, in which the binding operation of a binding band and excessive-part cutting operation thereof can be performed with a one-touch operation, by gripping a lever, in a manner such that a series of such operations can be repeated continuously.

In order to achieve the above object, there is essentially provided according to one aspect of the present invention a binding device comprising a set part into which an assembly of binding bands is inserted after being bent in a generally U-shaped configuration, a first cutter for cutting a single binding band off the assembly of binding bands through operation of a lever, a pusher device for pushing the single binding band thus cut off forwardly, a curved pivot guide arm for guiding a distal end of the single binding band towards a retainer portion formed on an opposite end of the single binding band, a push-in device for pushing the distal end of the single binding band into the retainer portion, a reducing device for reducing a distal end portion of the single binding band which protrudes from the retainer portion, a second cutter for cutting off the reduced distal end portion of the single binding band which still protrudes from the retainer portion, and a feed device for feeding the assembly of binding bands in a manner so as to match the pitch of the plurality of binding bands. The set part, the first cutter, the pusher device, the curved pivot guide arm, the push-in device, the reducing device, the second cutter, and the feed device are formed on a base plate having window openings through which working portions thereof protrude. A lower end of a link arm is pivotally connected to the lever, and an upper end of the link arm is fixed to a cross piece that is integrally coupled to the base plate in order to mechanically drive operation of the binding device responsive to a single mechanical movement of the lever.

According to another aspect of the invention, there is further provided a binding band including a band body made of plastic material, a retainer portion having a through-hole integrally formed on one end thereof, and an insertion guide piece integrally formed on the other end and adapted to be inserted into the retainer portion, wherein the insertion guide piece is formed into a generally linear configuration, so that it can be set to a binding device and inserted into a through-hole for binding smoothly.

According to a further aspect of the invention, there is further provided a process for manufacturing a binding band comprising the steps of heating a generally central area of an assembly of a binding band which is obtained in a flattened state, heating the same at least by a heater having a U-shaped groove with opposite ends of the assembly clamped, and cooling the same by a cooling mold having likewise a U-shaped groove.

With the above-mentioned construction of the present invention, by controlling the lever after the binding band linkage member is set in a predetermined position, a series of binding operation can be performed whereby a unitary binding band is cut off the binding band linkage member, then the binding band is wound around an object to be bound set in a corresponding position, then a distal end (leading end) of the binding band is inserted into an insertion hole formed in a retainer portion and pushed so as to be reduced, and finally an excessive part of the binding band is cut off. Also, by returning the lever, that is, by untightening the gripping force, the next binding band can be held in a standby position automatically.

Other objects and advantages of the invention will become more apparent during the course of the following description when taken in connection with the accompanying drawings.

BRIEF DESCRIPTION OF THE DRAWINGS

FIG. 9 is a cross sectional view taken on line 9—9 of FIG. 1;

FIG. 10 is a cross sectional view taken on line 10—10 of FIG. 1;

FIG. 11 is a cross sectional view taken on line 11—11 of FIG. 1;

FIG. 12 is a cross sectional view taken on line 12—12 of FIG. 1;

FIG. 13 is a fragmentory view showing a field gear and a cutter;

FIG. 14 is a cross sectional view of a lower part of a grip;

FIG. 15 is a plan view showing a binding band according to the present invention;

FIG. 16 is a front view;

FIG. 22 is a perspective view of an important portion of a modified embodiment;

FIG. 23 is a perspective view showing a bound state;

FIG. 24 is a perspective view in which an assembly is formed in a U-shaped configuration;

FIG. 25 is a perspective view in which a connector is employed;

DETAILED DESCRIPTION OF THE EMBODIMENT

Figure 1:
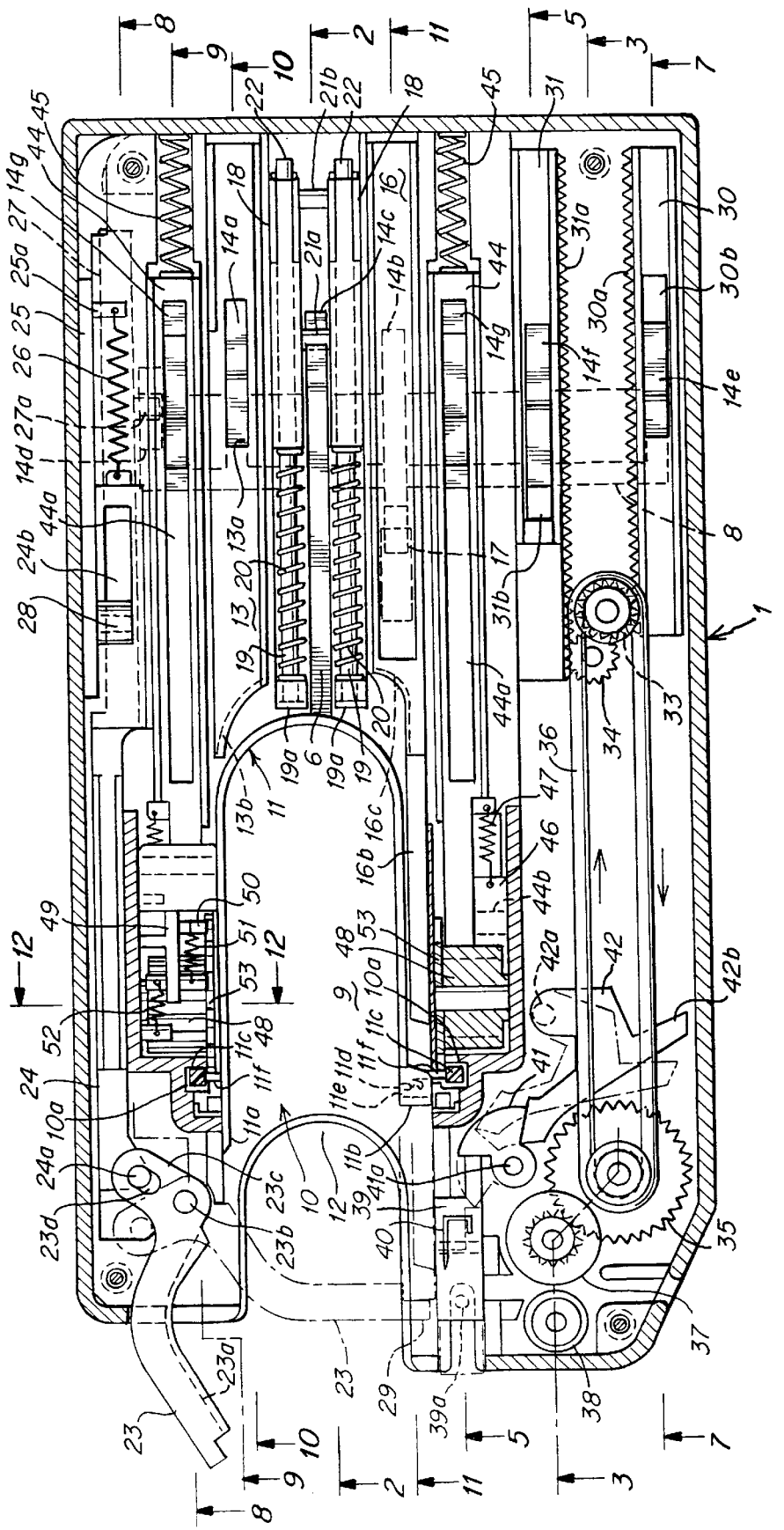
FIG. 1 is a cross sectional view showing a mechanism of a binding device according to the present invention.
Figure 2:
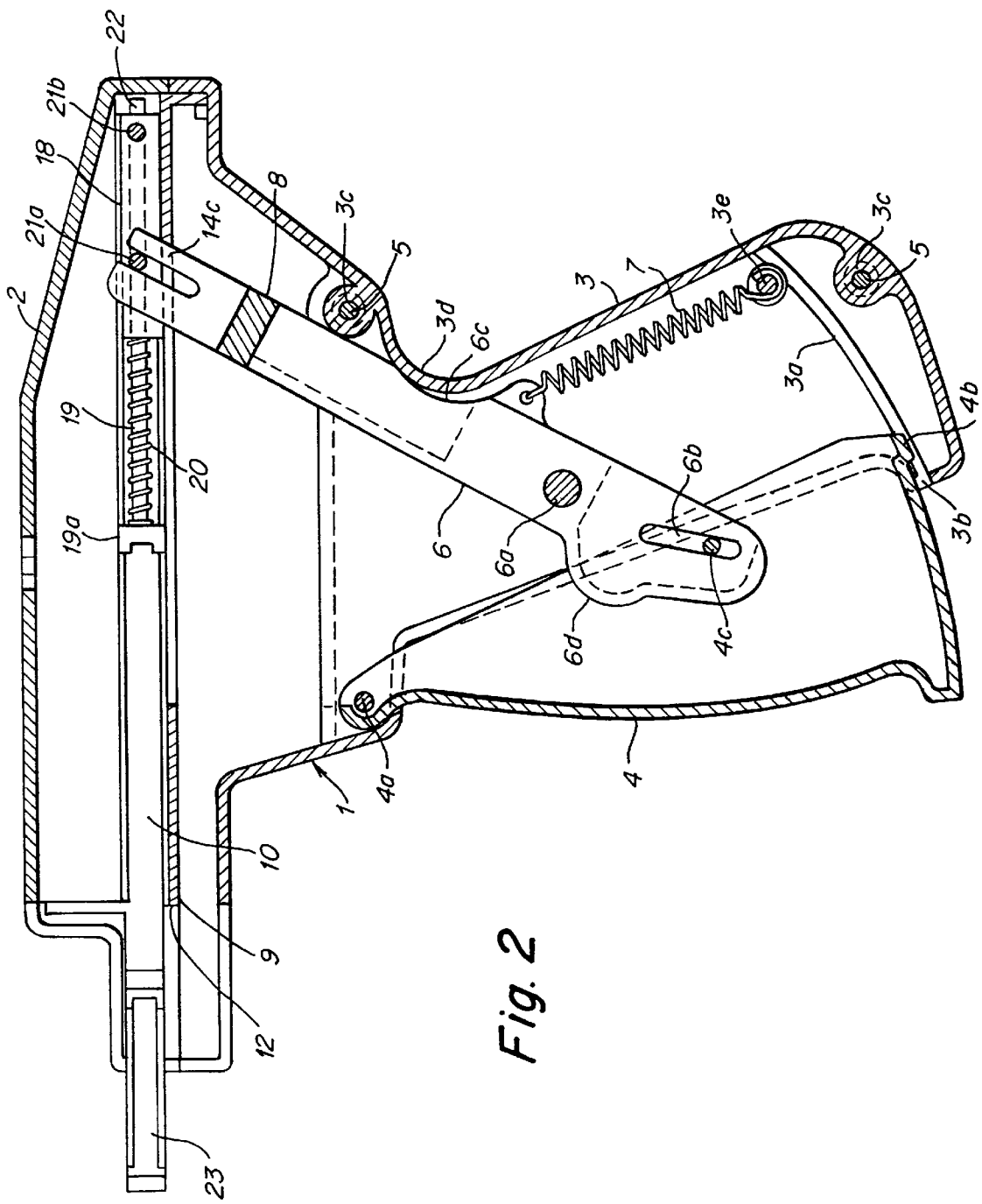
FIG. 2 is a cross sectional view taken on line 2—2 of FIG. 1.
Figure 3:
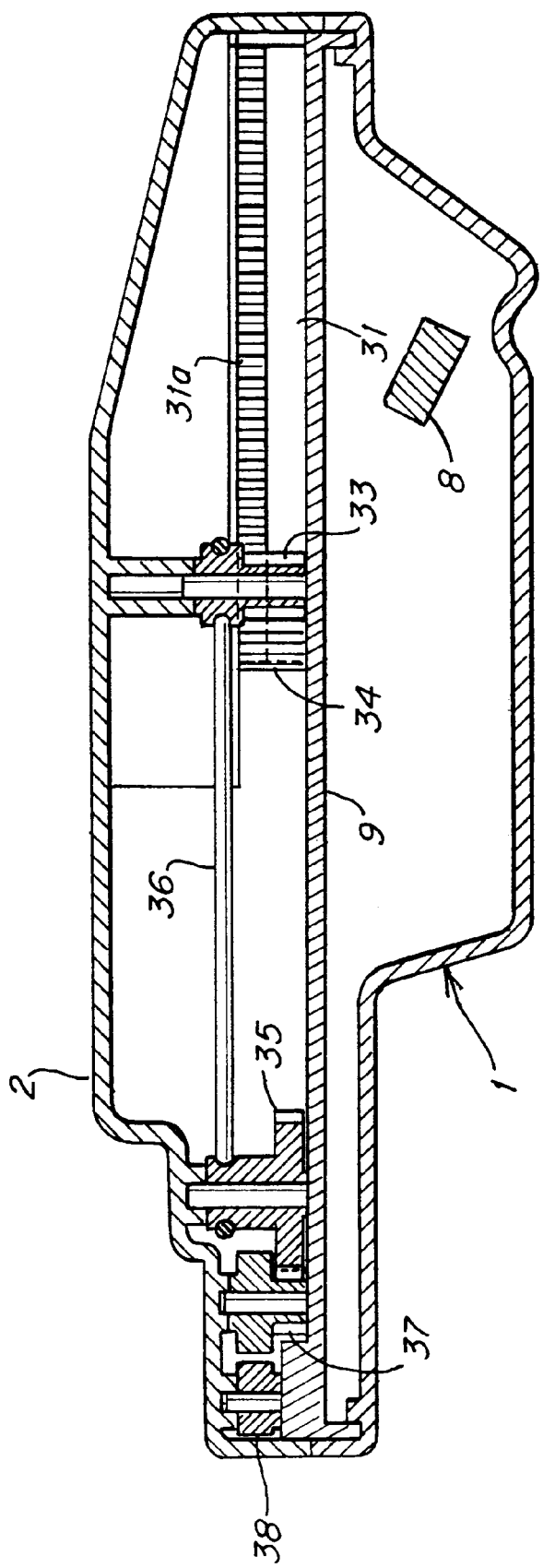
FIG. 3 is a cross sectional view taken on line 3—3 of FIG. 1.
Figure 4:
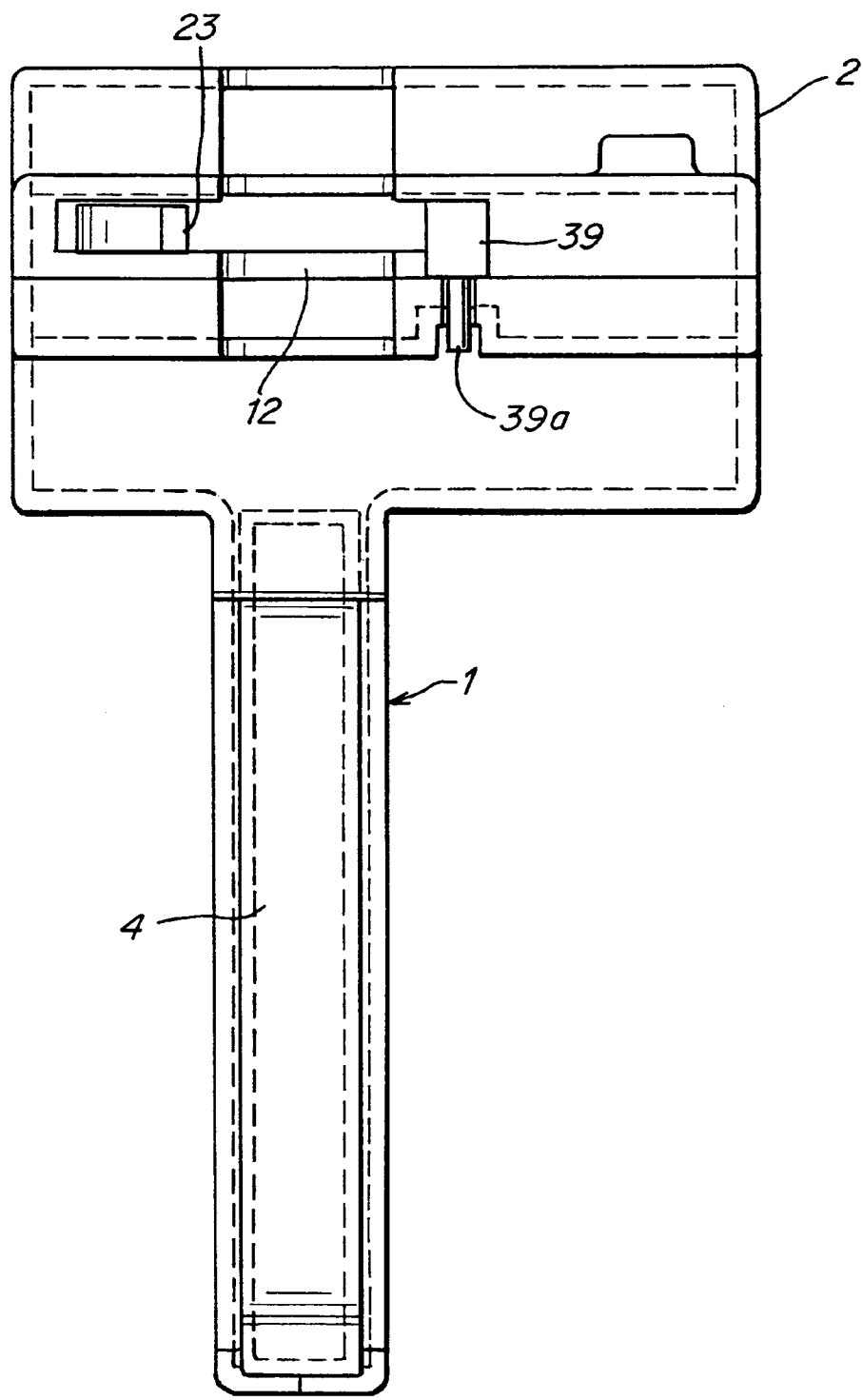
FIG. 4 is a front view.
Figure 5:
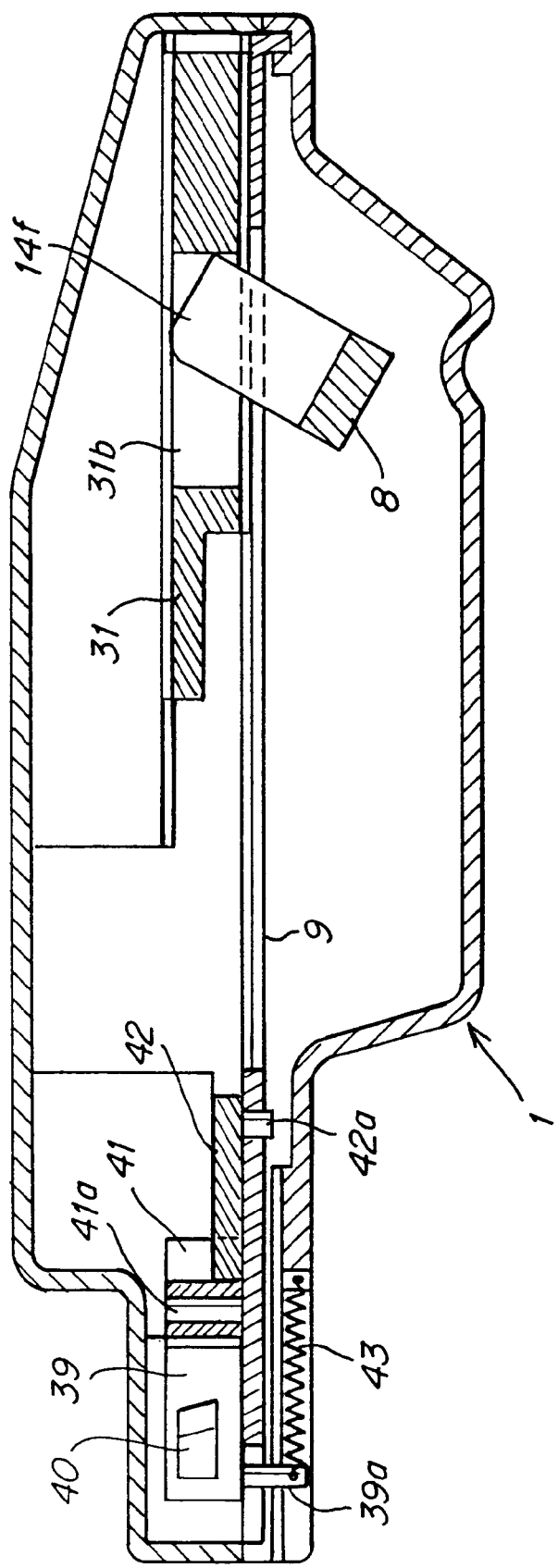
FIG. 5 is a cross sectional view taken on line 5—5 of FIG. 1.
Figure 6:
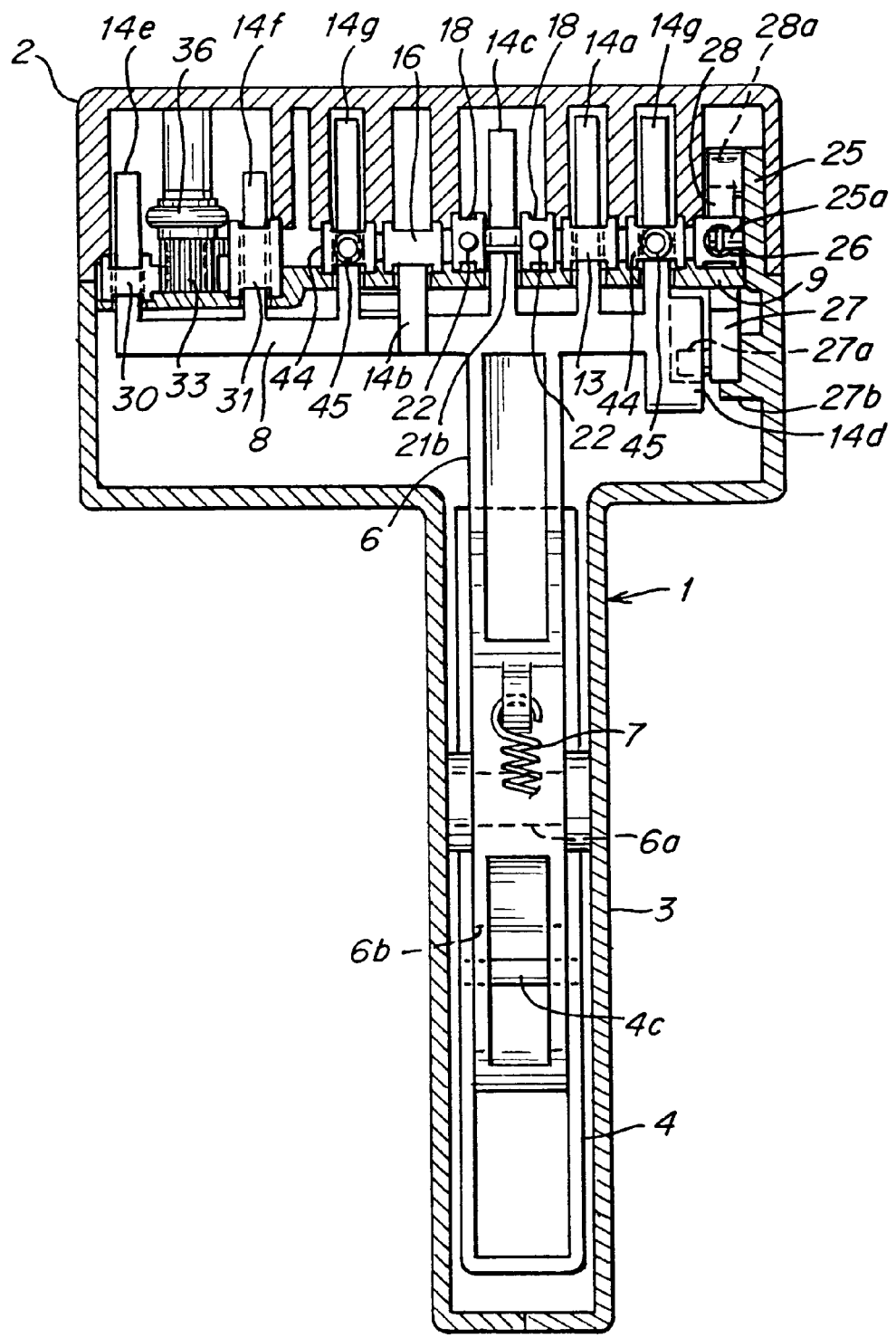
FIG. 6 is a cross sectional rear view of the mechanism.
Figure 7:
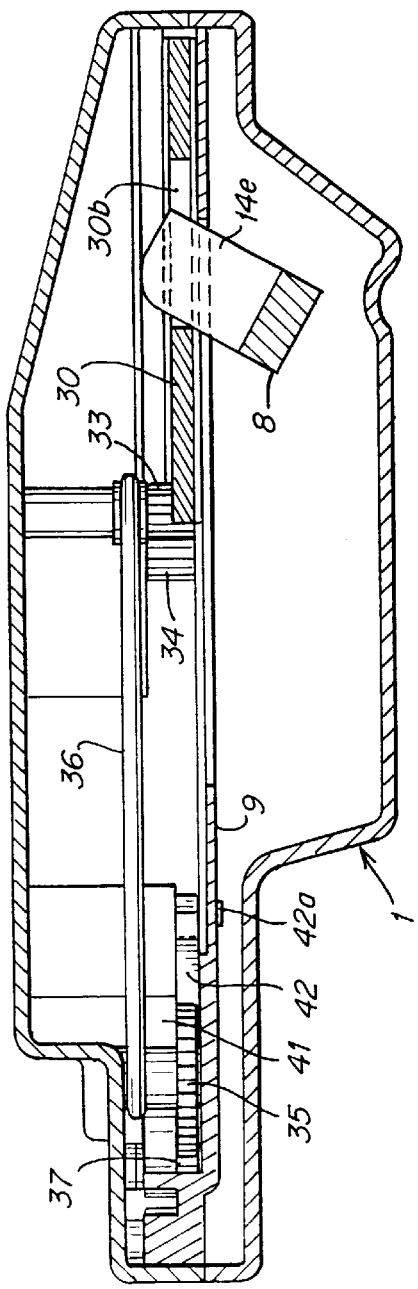
FIG. 7 is a cross sectional view taken on line 7—7 of FIG. 1.
Figure 8:
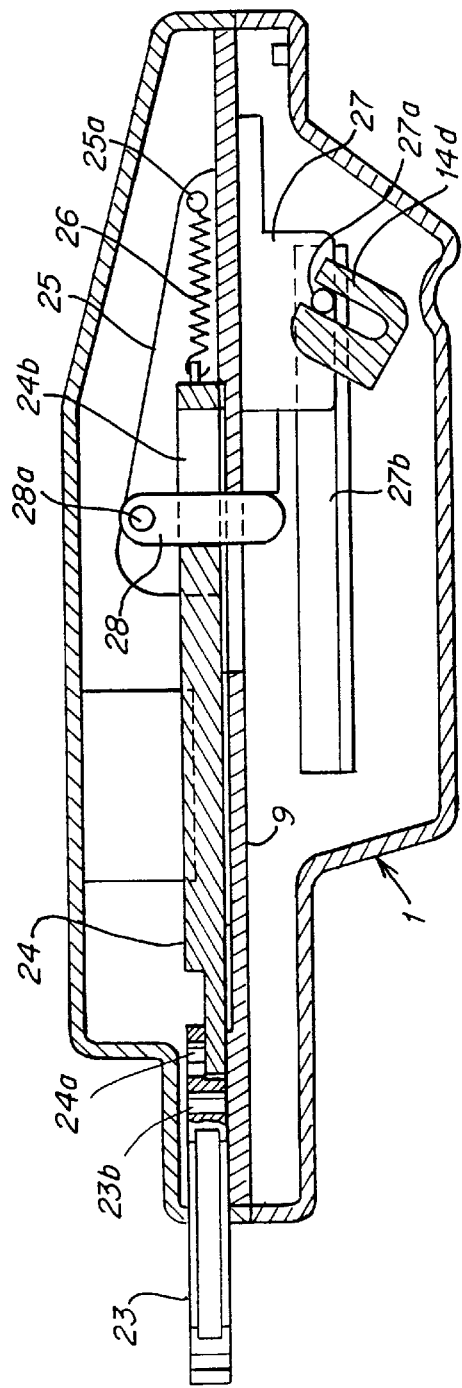
FIG. 8 is a cross sectional view taken on line 8—8 of FIG. 1.
Figure 17:
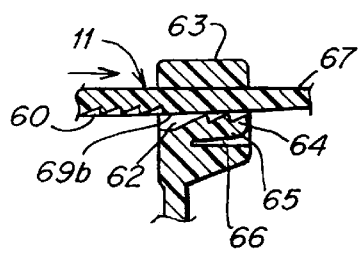
FIG. 17 is a sectional view showing a guide piece pierced into a retainer portion.
Figure 18:
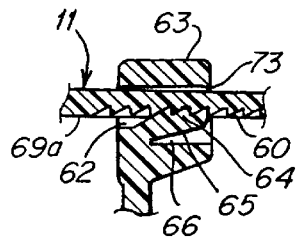
FIG. 18 is a sectional view showing an engagement state.
Figure 19:
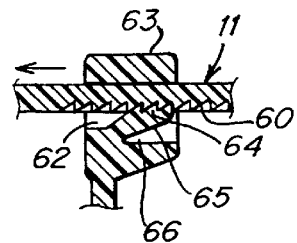
FIG. 19 is a sectional view showing a state in which a force is applied in a withdrawing direction.
Figure 20:
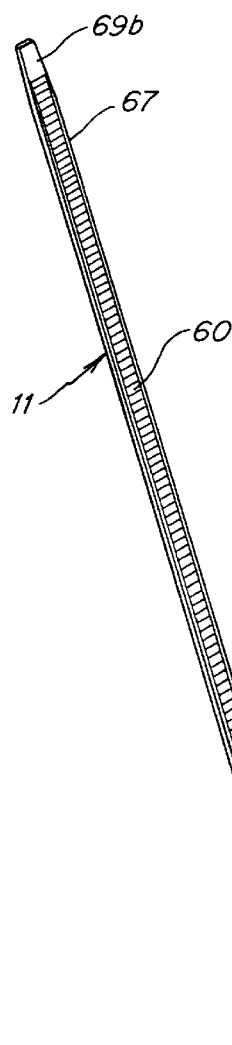
FIG. 20 is a perspective view as a unitary body.
Figure 21:
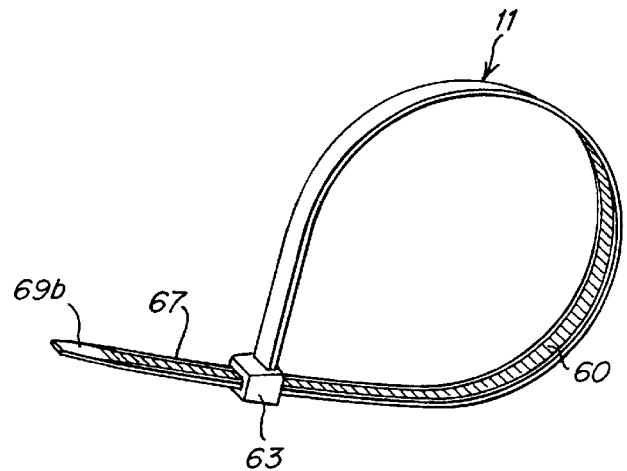
FIG. 21 is a perspective view showing a bound state.
Figure 26:
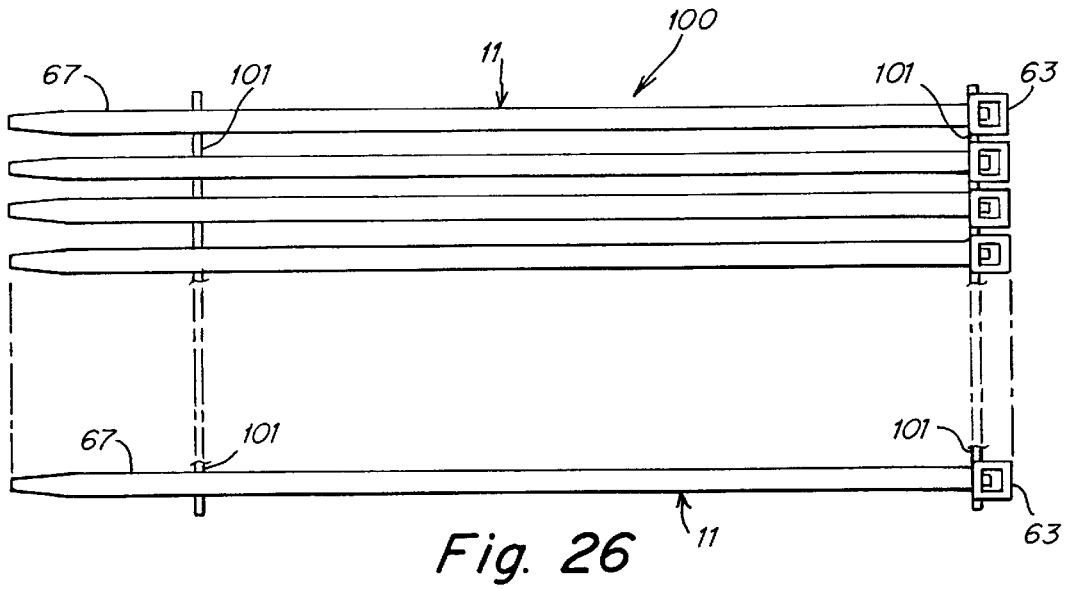
FIG. 26 is a plan view showing a state before molding.
Figure 27:
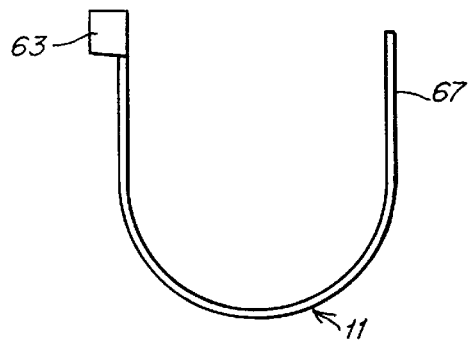
FIG. 27 is a front view in which the guide piece is formed rather short.
Figure 28:
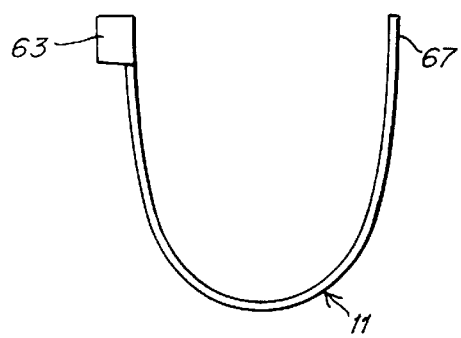
FIG. 28 is a front view in which a guide element has a length reaching the retainer portion.
Figure 29:
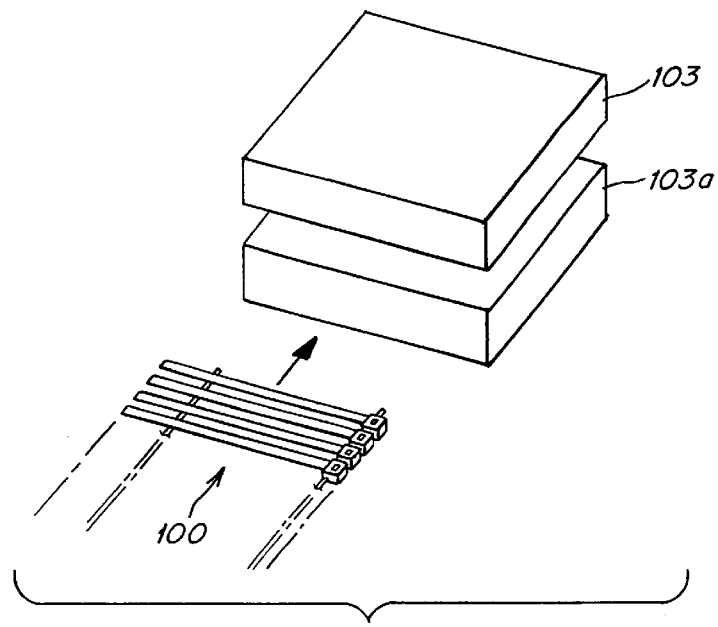
FIG. 29 is a perspective view showing a molding process.
Figure 30:
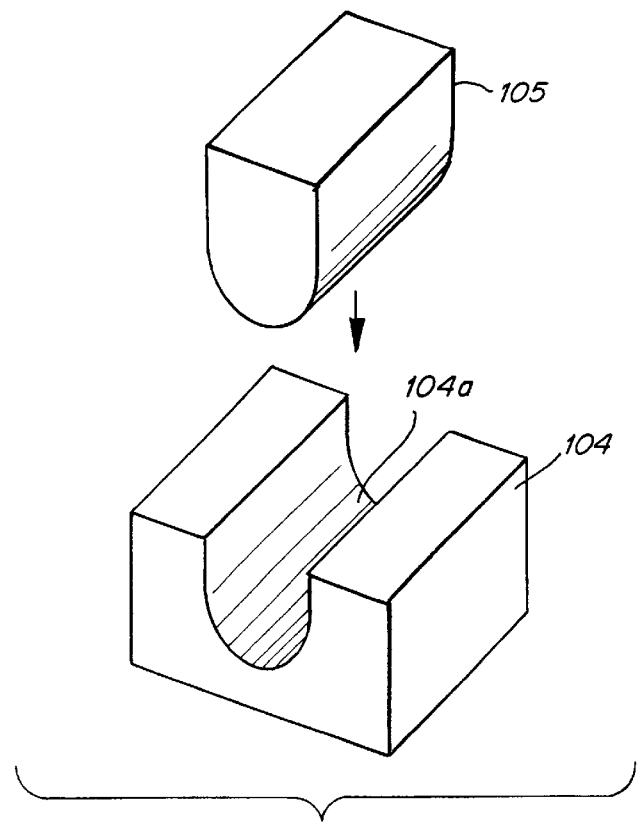
FIG. 30 is a perspective view showing a mold for shaping a U-shaped configuration.
Figure 31:
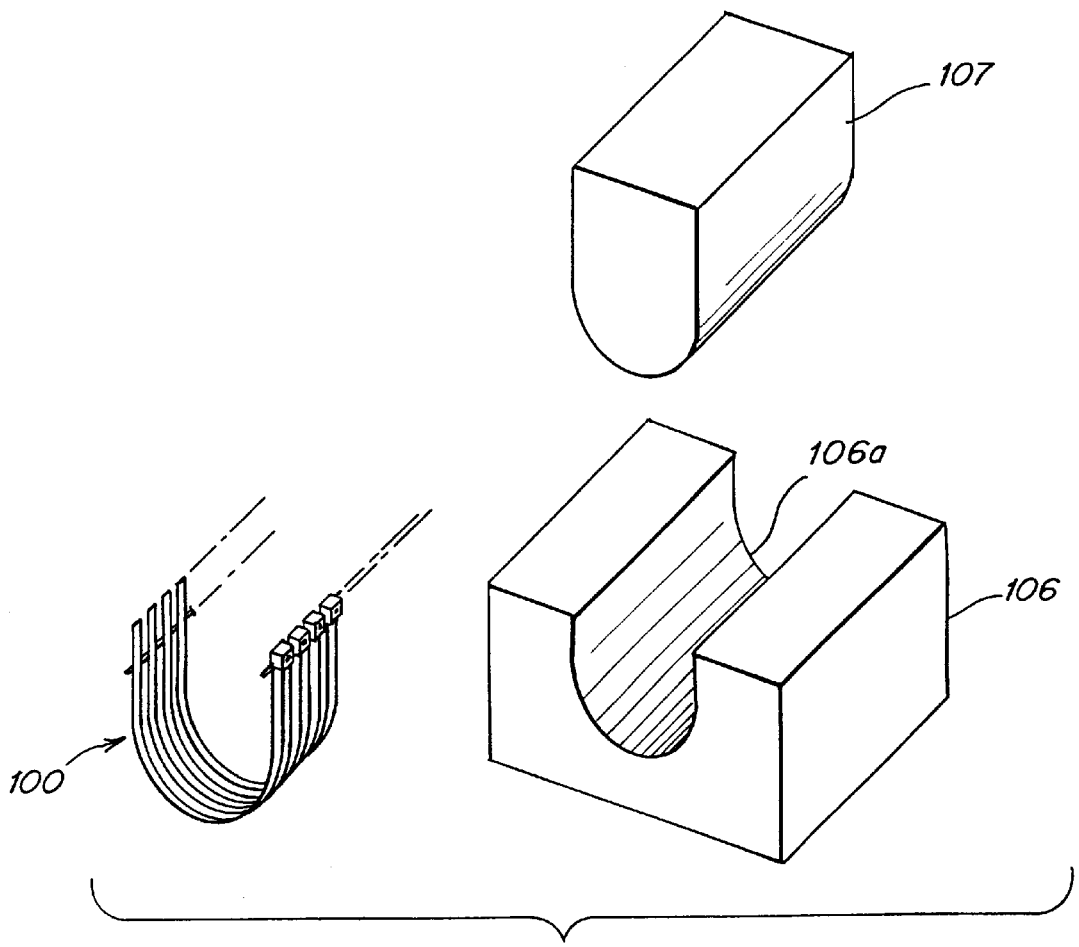
FIG. 31 is a view showing a process for forcibly cooling the assembly.
Figure 32:
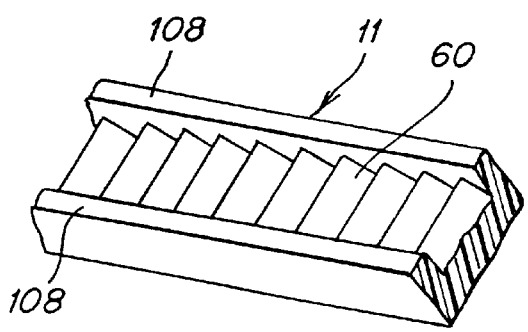
FIG. 32 is a perspective view showing a part of the binding band.

One embodiment of the present invention will now be described with reference to the accompanying drawings. FIG. 1 is a plan view showing a mechanism of a binding device of the present invention, FIG. 2 is a view taken on line 2—2 of FIG. 1, FIG. 3 is a view taken on line 3—3 of FIG. 1, FIG. 4 is a front view, FIG. 5 is a view taken on line 5—5 of FIG. 1, FIG. 6 is a cross-sectional rear view of the mechanism, FIG. 7 is a view taken on line 7—7 of FIG. 1, FIG. 8 is a view taken on line 8—8 of FIG. 1, FIG. 9 is a view taken on line 9—9 of FIG. 1, FIG. 10 is a view taken on line 10—10 of FIG. 1, FIG. 11 is a view taken on line 11—11 of FIG. 1, FIG. 12 is a view taken on line 12—12 of FIG. 1, FIG. 13 is a view showing a field gear and a cutter, FIG. 14 is a sectional view of a lower part of a grip and a view showing a pivotal attachment portion of a pivotal guide arm, FIG. 15 is a plan view showing a binding band of the present invention, FIG. 16 is a front view, FIG. 17 is a sectional view showing a guide piece pierced into a retainer portion, FIG. 18 is a sectional view showing an engagement state, FIG. 19 is a sectional view showing a state in which a force is applied in a withdrawing direction, FIG. 20 is a perspective view as a unitary body, FIG. 21 is a perspective view showing a bound state, FIG. 22 is a perspective view of an important portion of a modified embodiment, FIG. 23 is a perspective view showing a bound state, FIG. 24 is a perspective view in which an assembly is formed in a U-shaped configuration, FIG. 25 is a perspective view in which a connector is employed, FIG. 26 is a plan view showing a state before molding, FIG. 27 is a front view in which the guide piece is formed rather short, FIG. 28 is a front view in which a guide element has a length reaching the retainer portion, FIG. 29 is a perspective view showing a molding process, FIG. 30 is a perspective view showing a mold for shaping a U-shaped configuration, FIG. 31 is a view showing a process for forcibly cooling the assembly, and FIG. 32 is a perspective view showing a part of the binding band.

In the Figures, reference numeral 1 denotes a body case. This body case 1 consists of one pair of left and right case elements. A cover 2 is attached to the body case 1 to close an internal mechanism of the body case 1. The body case 1 has a grip 3 integrally formed therewith. This grip 3 is open at its front surface. A lever 4 is pivotably supported at an upper end thereof by the open front surface portion through a pin 4a. A pivot guide 3a for the lever 4 is formed on a lower part of the grip 3. A front end of the pivot guide 3a is defined by a stopper 3b. The stopper 3b is engageable with a stepped portion 4b formed on an inner end of a bottom surface of the lever 4 so that the lever 4 will not escape. Reference symbolic numerals 3c, 3c . . . denote threaded holes for tightly joining the body case 1 to the grip 3 through screws 5.

A link arm 6 is attached at a lower end portion thereof to the grip 3 through a shaft 6a. This link arm 6 is normally tension biased by a coiled spring 7 such that an upper end of the link arm 6 is located backwardly. One end of the coiled spring 7 is attached to a protrusion 3e which is engageable with the pivot guide 3a at an inner upper part thereof A slit 6b is formed in a lower end portion of the link arm 6. This slit 6b is in engagement with a pin 4c disposed within the lever 4. A dished out portion 6c is formed in a rear surface center of the link arm 6. The portion 6c is brought into abutment with an inner surface of a curved portion 3d formed on the grip 3, thereby to enhance a smooth action of the link arm 6 due to principles of the lever. In addition, a swollen portion 6d is formed on a front surface of a lower end portion of the link arm 6 and brought into abutment with an inner surface of the front portion of the lever 4 when the operation of the lever 4 is finished, so that the clicking perception can be enjoyed.

The link arm 6 is integrally provided on an upper part thereof with a cross piece 8. This cross piece 8 is integrally provided with a plurality of working portions for performing the functions as later described. The respective working portions vary in length, so that an intended time lag can be obtained at the time of actuation.

In the illustration, reference numeral 9 denotes a base plate. This base plate 9 is disposed at an upper part of the body case 1. Elongate window openings through which the working portions are projected and pivotable, and guides for various mechanical parts driven by the working portions, and the like are formed on the base plate 9.

In the illustration, reference numeral 10 denotes an installation part for installing a linkage member for linking the binding bands 11 at two places, one at an outer portion of the distal end portion 11a thereof and the other at an outer portion of the retainer portion 11b at equal spaces and in parallel relation through the linking portions 11c, 11c. The linking portions 11c, 11c with the binding bands 11 bent in a generally U-shaped configuration are set in the guides 10a, 10a. Each binding band 11 is formed on an upper surface thereof with a plurality of engagement claw portions. The distal end portion 11a of the binding band 11 is reduced in thickness. The retainer portion 11b is formed with an insertion hole 11e which includes therein an engagement portion 11d engageable with the engagement claw portion. In the illustration, reference 12 denotes a notch for setting an object to be bound.

Reference numeral 13 denotes a first feed cut lever for cutting the binding band 11 off the distal end portion 11a and the linking portion 11c. An engagement window opening 13a formed vertically all the way through the feed cut lever 13. The first working portion 14a provided on the cross piece 8 is fitted for engagement into the engagement window opening 13a. A front surface of the first feed cut lever 13 is defined by a curved surface portion 13b. This curved portion 13b pushes a rear surface on the curved distal end portion 11a side of the binding band 11 to urge the joint portion 11f between the distal end portion 11a and the linking portion 11c against the cutter 15 so as to be cut off. Another cutter placed out of registry with the cutter 15 is disposed so that the joint portion 11f between the retainer portion 11b of the binding band 11 and the linking portion 11c can be cut off.

Reference numeral 16 denotes a second feed cut lever. This feed cut lever is formed on a lower surface thereof with a projection 16a. A front surface of the second working portion 14b provided on the cross piece 8 is abutted for engagement with a rear surface of the projection 16a. Also, the second feed cut lever 16 is formed on a distal end thereof with an extension portion 16b. A curved surface portion 16c is formed on a distal end of the extension portion 16b. By operating the lever 4 in synchronism with the first feed cut lever 13, the second feed cut lever 16 is also actuated such that the rear surface of the retainer portion 11b is pushed by the distal end of the extension portion 16b. In addition, the rear surface on the retainer portion 11b side is pushed by the curved surface portion 16c, so that the joint portion 11f is urged against the second-mentioned cutter 15 which is placed in out of registry with the first-mentioned cutter 15 so as to be cut.

Reference numeral 17 denotes a return cam pivotably supported by a pin 17a. An upper end of the return cam 17 is abutted for engagement with the front surface of the projection 16a of the second feed cut lever 16. A coiled spring 17b is disposed between the return cam 17 and a stepped portion provided on the second working portion 14b and adapted to bias the lever 16 normally backwardly. Owing to this arrangement, the returning after the cutting operation becomes more accurate.

Reference numeral 18 denotes a case for one pair of push bars 19, 19. This case 18 exhibits a sleeve-like configuration. A shaft of each of the push bars 19, 19 is fitted in the sleeve-like case 18. The push bars 19, 19 are formed on distal ends thereof with pushing portions 19a, 19a. On a periphery of each of the push bars 19, 19 a coiled spring is resiliently disposed between a rear surface of the pushing portion 19a and a front surface of the case 18.

The adjacent cases 18 are connected by front and rear pins 21a, 21b. The front pin 21a is provided with the above-mentioned cross piece 8 with which the third working portion 14c having a forked distal end is engaged. That is, when the third working portion 14c is actuated by the lever 4 through the link arm 6, the case 18 is moved simultaneously forwardly and its pressing portions 19a, 19a are bent while being damped by the coiled springs 20, 20, and pushes the rear surface of the binding band 11 cut off the linking portions 11c, 11c, so that the binding band 11 is fed forwardly. Reference numerals 22, 22 denote stopper pins, respectively.

Reference 23 denotes a pivotal guide arm. This pivotal guide arm 23 is bent generally into a doglegged shape and formed inside thereof with a guide 23a for guiding the distal end side of the binding band 11. A distal end portion of the guide 23a is cut away in order to allow the distal end portion 11a of the binding band 11 to project.

A basal portion of the pivotal guide arm 23 is supported by the base plate 9 through a pin 23b. An oblong hole 23d formed in an extension 23c extending from the basal portion of the pivotal guide arm 23 is in engagement with a protruding pin portion 24a provided on a front protruding end of the guide bar 24.

A coiled spring 26 is disposed between a rear end of the guide bar 24 and a pin 25a projecting from a stopper wall 25. The guide bar 24 is biased normally backwardly by the coiled spring 26. Reference numeral 27 denotes a guide driver. This guide driver 27 is provided on a side surface thereof with a pin 27a projecting therefrom. A fourth working portion 14d provided on a side of the cross piece 8 and having a forked distal end is in engagement with the pin 27a. Reference numeral 27b denotes a guide rail for the guide driver 27.

Reference numeral 28 denotes a guide point member. This guide point member 28 is vertically hung on the stopper wall 25 through a pin 28a secured to an upper end thereof The guide point member 28 is inserted into a slit 24b formed in the guide bar 24. A front end surface of a guide driver 27 is in abutment with a rear surface of its lower end. That is, when the fourth working portion 14d is actuated by operating the lever 4, the guide driver 27 is moved forwardly to push a lower end of the guide point member 28. Against a biasing force of the coiled spring 26, this pushing force causes the guide point member 28 to push the guide driver 24 forwardly, and the protruding pin portion 24a on the protruding end pushes the inner wall surface of the oblong hole 23d of the pivotal guide arm 23. As a result, the pivotal guide arm 23 is pivoted about the pin 23b in such a manner as to surround the notch portion 12 as indicated by an imaginary line. That is to say, this motion makes it possible for the object to be bound, which is set into the notch portion 12, to be wound therearound with the binding band 11.

In that state, since the retainer portion 11b of the binding band 11 is positioned by the stopper 29, the pushing force applied to the binding band 11 by the push bars (pushing portions 19a) act on the distal end portion 11a. As a result, the distal end portion 11a is inserted into the insertion hole 11e formed in the retainer portion 11.

Reference numeral 30 denotes a first rack bar. This first rack bar 30 has a toothed portion 30a at an inner side thereof and is formed with a vertically elongate slit 30b in a generally central area thereof, A fifth working portion 14e provided with the cross piece 8 is fitted into the slit 30b. Reference numeral 31 denotes a second rack bar. A toothed portion 31a of this second rack bar 31 is formed at an inner side in such a fashion as to oppose the toothed portion 30a of the first rack bar 30. This second rack bar 31 is formed with a vertically elongate slit 31b. A sixth working portion 14f is fitted in the slit 31b. This sixth working portion 14f is abutted with a rear end of the slit 31b to push the second rack bar 31 backwardly in a released state of the lever 4.

A first gear drive 33 is in engagement with the toothed portion 30a of the first rack bar 30, and a second gear drive 34 is in engagement with a first gear drive 33. This second gear drive 34 is in engagement with a toothed portion 31a of the second rack bar 31.

Reference numeral 35 denotes a first field gear. An endless belt 36 is disposed between this first field gear 35 and an upper end of the first gear drive 33. The endless belt 36 is caused to travel one way in a direction as indicated by an arrow in the illustration due to engagement relation between the first and second rack bars 30, 31 and the gear drives 33, 34. The first rack bar 30 is made movable forwardly by the working portion 14e. Similarly, the second rack bar 31 is made movable forwardly by the second gear drive 34 engaged with the first gear drive 33 which is engaged with the first rack bar 30.

The first field gear 35 is in engagement with a toothed portion of the second field gear 37 having a reduced diameter. An enlarged diameter portion of the second field gear 37 captively holds and transfer the distal end portion 11a passed through the retainer portion 11b of the binding band 11 by a field roller 38 formed on a peripheral surface thereof with a knurl or a ratchet.

In this way, an excessive portion of the distal end portion 11a of the binding band 11 which is protruded after passing through the retainer portion 11b is cut off by a cutter 40. This holder 39 is operated by being pushed with a sector-shaped cut lever 41 whose basal end is pivotally supported by a pin 41a. This cut lever 41 is actuated when its one surface is pushed with one end of a push handle 42.

One end portion of the push handle 42 is pivotally supported by a pin 42a. The push handle 42 is actuated when its control portion 42b, which is located away from the pivot point of the pin 42a, is pushed by the first rack bar 30.

The holder 39 has a pin 39a projecting from a lower end thereof The holder 39 is biased normally backwardly by a coiled spring 43 disposed on the pin 39a. By releasing the lever 4, the second rack bar 31 is returned by a sixth working portion 14f, and the first rack bar 31 is returned by the first gear drive 33. As a consequence, the push handle 42 is brought into a free state again.

Reference numerals 44, 44 denote field bars for feeding, one pitch by one pitch, the linkage member of the binding band 11. This field bar 44 feeds the linkage member of the binding band 11 by catching the joint portions 11f, 11f of the binding band 11 with a gear as later described. Two of such field bars corresponding to the distal end portion 11a side and the retainer portion 11b side of the binding band 11 are prepared. The mechanisms to be described are all synchronously operated as the same mechanisms.

The field bar 44 is formed with a vertical through-hole 44a having a very long distance so that an operation force can be applied thereto at a final stage. A seventh working portion 14g is fitted into the vertical through-hole 44a initially and with an abutment state with its rear end surface thereafter. A rear end of the field bar 44 is resiliently biased by a coiled spring 45.

A front end of the field bar 44 is bent downwardly. A pin 44 projects from a basal point of the field bar 44. A field hook 46 is pivotally attached to the pin 44b. An upper portion of a rear end of this field hook 46 is tensioned by a coiled spring 47. A claw member 46a provided on an upper surface of a front end of the field hook 46 is biased backwardly by this tension, so that the claw member 46a is brought into engagement with a ratchet 48.

Reference numeral 49 denotes a holder of a second ratchet 50. This holder 49 is attached with its two parallel slits 49a, 49a engaged with pins 49b, 49b, respectively. The second ratchet 50 is pivotally supported on a front portion of the holder 49. The second ratchet 50 includes a stopper claw 50a of the ratchet 48. An engagement projection 50b on a rear end of the second ratchet 50 is engaged with a stopper projection 49c of the holder 49 to normally restrain the ratchet 48.

A coiled spring 51 is disposed between an upper end of the second ratchet 50 and a pin provided on a front end of the holder 49, and another coiled spring 52 is disposed between the upper end of the second ratchet 50 and the other end of the pin. Owing to this arrangement, the holder 49 is biased normally forwardly.

The ratchet 48 is coaxially attached with a feed gear 53. This feed gear 53 is formed with spacer protrusions 53a, 53a, . . . adapted for preventing friction with a cover 54 attached to the installation part 10 of the binding band 11. That is, when the second working portion 14g causes the field bar 44 to move, the claw member 46a of the field hook 46 is disengaged from the ratchet 48, and the holder 49 is retreated along the slits 49a, 49a against the effect of the coiled spring 52. As a consequence, the engagement projection 50b of the second ratchet 50 is disengaged and the stopper claw 50a is disengaged from the ratchet 48 by the coiled spring 51. During the course of returning, the claw member 46a of the field hook 46 catches the racket 48 to rotate this ratchet 48 by one pitch. In synchronism with this rotation, the feed gear 53 is also rotated by one pitch. This rotation causes the joint portion 11f to be feed, so that the new binding band 11 is held in a standby position.

A binding device according to the present invention is constructed and operated in the manner as described above. Accordingly, by one touch operation of the lever, a series of binding operation can be performed in which an object to be bound is wound around with a binding band, an excessive portion of the binding band is cut off, the linked binding band is fed, and a new binding band is held in a standby position.

In FIGS. 15 to 32, reference numerals 11 denotes a band body. This band body 11 as a whole is molded from plastic material having a comparatively strong stiffness. One end of the band body 11 is integrally formed with a retainer portion 63 having a through-hole 62. A movable portion 65 is integrally formed on an upper surface of the interior of the through-hole 62 of the retainer portion 63. The movable portion 65 includes a retaining claw portion 64 which is engageable with a ratchet portion as later described. A basal end of the movable portion 65 is cut 66 into a wedge-shaped configuration so that the basal end becomes gradually narrower. The basal end of the movable portion 65 thus shaped acts as a spring due to resiliency of its material.

The other end of the band body 11 is integrally formed with a guide piece 67 which is to be pushed into the through-hole 62 of the retainer portion 63. This guide piece 67 is slightly tapered and gradually reduced in thickness towards its tip, so that it can be easily pushed into the through-hole 62.

An upper surface of this guide piece 67 is formed into a ratchet-like configuration, while a lower surface thereof is formed into a flat shape.

The guide piece 67 is gradually reduced in thickness towards its tip relative to the band body 11, so that the pushing operation of the guide piece 67 into the through-hole 62 of the retainer portion 63 is accomplished easily and smoothly. A ratchet portion 60 is continuously formed on the upper surface of the band body 11 with a slippery portion 69a formed between the band portion 11 and the retainer portion 63, and another slippery portion 69b formed on a distal end of the guide piece 67. Thus, when binding, the upper surface side formed with the ratchet portion 60 becomes an inner surface of a ring to be formed and serves as an abutment surface with an object to be bound.

In the illustration, reference 71a denotes a first linkage member, and 71b denotes a second linkage member. The first linkage member 71a is located inwardly and downwardly of the retainer portions 63 of the band bodies 11 arranged at predetermined spaces and in parallel relation. The second linkage member 71b is formed between the ratchet portion 60 and the guide piece 67 and located downwardly of the ratchet portion 60.

The first linkage member 71a and the second linkage member 71b are in parallel relation to each other, that is, they are in perpendicular relation to the band body 11, 11, . . . Integrity between the first and second linkage members 71a, 71b and the band bodies 11, 11, . . . is accomplished through a joint portion 72, thereby forming an assembly.

A binding band according to this embodiment is constructed in the manner as mentioned above. The method of use and functions of this binding band will now be described. The binding band constituting the assembly is bent into a U-shaped configuration with the ratchet portion 60 side of the band body 11 inside, and the first and second linkage members 71a, 71b are inserted into a predetermined guide groove and held in a standby state.

A loading portion of the binding band constituting the assembly is opened forwardly so as to also servie as a set portion for the object to be bound. When a control lever of a binding device is actuated after the binding band is loaded and the object to be bound is set, the joint portion 72 near the guide piece 67 and the joint portion 72 near the retainer portion 63 are simultaneously cut. Then, the free guide piece 67 is pushed into the through-hole 62 of the retainer portion 63 and the under surface (outside of the U-shaped binding band) is continuously pushed with a pusher member so that the guide piece 67 is fully inserted into the through-hole 62 until the leading end of the guide piece 67 is pushed out of the through-hole 62.

Then, the guide piece 67 coming out of the through-hole 62 is clamped, and pulled to be reduced. When the leading end of the guide piece 67 is brought to a terminal position which varies depending on the size of the object to be bound, an extra length portion (including the guide piece 67) of the band body 11 exposed from the retainer portion 63 is cut off the band body 11.

In this way, the binding operation for the object to be bound is carried out. With respect to a binding state, the band body 11 following the guide piece 67 pushes a retaining claw portion 64 when it passes the through-hole 62, so that the movable portion 65 is lowered. Then, the ratchet portion 60 is brought into engagement with the retaining claw portion 64. Since the claw of the ratchet 60 has a predetermined orientation, the band body 11 can through the interior of the through-hole 62 in as required. When the band body 11 is brought into the predetermined position, namely, the terminal position, the ratchet portion 60 and the retaining claw portion 64 are stably engaged with each other and the movable portion 65 is restored to its original position.

In such a stable engagement state, since the ratchet portion 60 and the retaining claw portion 64 are positionally superimposed, a very small space 73 is formed between the band body 11 and an inner wall surface of the through-hole 62. When a force in the withdrawing direction is applied to the band body 11 in that state, the ratchet portion 60 causes the retaining claw portion 64 to be pulled up due to its orientation, the wedge-shaped cut portion 66 is spread and the movable portion 65 is raised. Further, the band body 11 is brought into intimate contact with the inner wall surface with the through-hole 62, so that the band body 11 cannot be withdrawn. Thus, the band body 11 is held in a completely locked state.

As shown in FIGS. 22 and 23, the binding band 11 may be constructed such that both the through-hole 62a and the band body 11 are oriented in a horizontal direction along the upper surface side of the band body 11. In this case, the retaining claw portion 64a of the ratchet portion 60 is erected within the through-hole 62a. In doing so, the guide piece 67 rests along the upper surface of the band body 11 and no special cutting becomes necessary.

The assembly of the binding bands are preferably bent into the U-shaped configuration from the beginning in order to match with the binding device. By doing so, the loading operation can be performed more easily. For example, reference numeral 100 of FIG. 24 denotes an assembly which is preliminary bent into an U-shaped configuration. In the example of FIG. 24, the respective guide pieces 67, 67 and the respective retainer portions 63, 63 are integrally connected through joint portions 101, 101, respectively. For the sake of easy understanding, FIG. 24 shows the joint portions 101 somewhat longer than their actual length. Actually, they may be a spot welding. This spot welding is better because when the band body 1 is cut into a unitary member, handling becomes easy.

In FIG. 25, the assembly 100a having the linkage members 71a, 71b is bent into a U-shaped configuration.

In order to forms the assemblies 100, 100a each into the U-shaped configuration, the assemblies 100, 100a are molded are molding into a flat shape as shown in FIG. 26, using an ordinary mold. Then, the flattened assemblies 100, 100a are sandwiched between two heaters 103 and 103a, so that the areas, which are required to be bent into the U-shaped configuration, i.e., the central areas of the band bodies 11, . . . , are heated for 2 to 10 seconds at a temperature of 200 to 250° C. and opposite ends are clamped. Then, the process proceeds to the next step.

Subsequently, this assembly is sandwiched between a lower heater 104 with a U-shaped groove formed in an upper surface thereof and a dome-like upper heater 105 which is to be fitted into the groove 104a and heated for 1 to 5 seconds at a temperature of 200 to 250° C.

Then, the heated and U-shaped assembly 100 is held between cooling mold halves 106 and 107 having the same configuration as the lower and upper heaters 104, 105 and cooled for 5 to 10 seconds at a room temperature. By the above three steps, the assemblies 100, 100a are retained in the U-shape. Since there is a fear that the projecting part of the ratchet portion 60 is deformed and crushed during the heating and cooling processes, protective erected walls 108, 108 may be formed on opposite edges along the ratchet portion 60 of band body 11. With such a construction, the retaining claw portion 64 is located between the erected walls 108 and 108 and engaged with the ratchet portion 60.

Obviously, numerous modifications and variations of the present invention are possible in light of the above teachings. It is therefore to be understood that the scope of the appended claims is not limited to the particular embodiments specifically described herein.

What is claimed is:

1. A binding device comprising:

a set part into which an assembly of binding bands is inserted after being bent in a generally U-shaped configuration, said assembly of binding bands including a binding band linkage member adapted to link a plurality of binding bands at a generally equal pitch and in parallel relation;

a first cutter for cutting a single binding band off said assembly of binding bands through operation of a lever;

a pusher device for pushing said single binding band thus cut off forwardly;

a curved pivot guide arm for guiding a distal end of said single binding band towards a retainer portion formed on an opposite end of said single binding band;

a push-in device for pushing the distal end of said single binding band into said retainer portion;

a reducing device for reducing a distal end portion of said single binding band which protrudes from said retainer portion;

a second cutter for cutting off the reduced distal end portion of said single binding band which still protrudes from said retainer portion;

a feed device for feeding said assembly of binding bands in a manner so as to match the pitch of said plurality of binding bands;

a base plate on which said set part, said first cutter, said pusher device, said curved pivot guide arm, said push-in device, said reducing device, said second cutter, and said feed device are formed, said base plate having window openings through which working portions of said set part, said first cutter, said pusher device, said curved pivot guide arm, said push-in device, said reducing device, said second cutter, and said feed device protrude; and a link arm having a lower end pivotally connected to said lever, and an upper end fixed to a cross piece that is integrally coupled to said base plate in order to mechanically drive operation of said working portions of said set part, said first cutter, said pusher device, said curved pivot guide arm, said push-in device, said reducing device, said second cutter, and said feed device responsive to a single mechanical movement of said lever.

2. The binding device according to claim 1, wherein said single mechanical movement of said lever initiates a series of operations including a first cutting operation whereby said first cutter cuts said single binding band off said assembly of binding bands, and a second cutting operation whereby said second cutter cuts off the reduced distal end portion of said single binding band which still protrudes from said retainer portion.

3. The binding device according to claim 1, wherein said binding bands are made of a plastic material.

4. The binding device according to claim 1, wherein said binding bands each have a ratchet portion formed on an upper surface of the distal end thereof and a retaining claw portion formed within said retainer portion.

5. The binding device according to claim 4, wherein said ratchet portion comprises a plurality of continuously formed engagement claws, and said retaining claw portion comprises at least one retaining claw which is engagable with said engagement claws.

6. The binding device according to claim 1, wherein said binding band linkage member is disposed on a lower surface of said plurality of binding bands.

7. The binding device according to claim 6, wherein said binding band linkage member is disposed in a vicinity of said retainer portion of said binding bands.

* * * * *